United States Patent [19]

Szumski

[11] Patent Number: 4,921,318

[45] Date of Patent: May 1, 1990

[54] LENS SYSTEMS

[75] Inventor: Ronald Szumski, Rayleigh, United Kingdom

[73] Assignee: GEC-Marconi Limited, Stanmore, United Kingdom

[21] Appl. No.: 211,472

[22] Filed: Jun. 23, 1988

[30] Foreign Application Priority Data

Jun. 27, 1987 [GB] United Kingdom ............... 8715136

[51] Int. Cl.$^5$ .................. G02B 11/02; G02B 9/10; G02B 1/00
[52] U.S. Cl. .................. 350/1.4; 350/481; 350/482
[58] Field of Search ............... 350/1.2, 1.3, 1.4, 481, 350/482, 483

[56] References Cited

U.S. PATENT DOCUMENTS

| | | | |
|---|---|---|---|
| 3,622,218 | 11/1971 | Kruger | 350/1.4 |
| 3,674,330 | 7/1972 | Strong | |
| 4,398,786 | 8/1983 | Neil | 350/1.4 |
| 4,504,110 | 3/1985 | Pittenger | 350/1.3 |
| 4,621,888 | 11/1986 | Crossland et al. | 350/1.4 |
| 4,679,891 | 7/1987 | Roberts | 350/1.4 |
| 4,695,119 | 9/1987 | Neil | 350/1.4 |
| 4,697,866 | 10/1987 | Howard | 350/1.4 |
| 4,714,307 | 12/1987 | Palmer | 350/1.4 |

FOREIGN PATENT DOCUMENTS 124682 11/1984 European Pat. Off.

OTHER PUBLICATIONS

"Ultrawide Waveband Optics", Optical Engineering, Mar./Apr. 84, vol. 23, No. 2, pp. 111–116, Jamieson et al.
"Guide to Ir—Transmissive Materials", Laser Focus, Dec. 76, Lussier, pp. 47–50.
Applied Optics, Letters to the Editor, vol. 20, No. 24, Dec. 15, 1981.

Primary Examiner—Bruce Y. Arnold
Assistant Examiner—Terry S. Callaghan
Attorney, Agent, or Firm—Spencer & Frank

[57] ABSTRACT

A lens system for imaging infra-red radiation comprises two elements, one of Zinc Selenide and the other of either Zinc Sulfide or Cesium Bromide (5). Lens configurations are shown which allow imaging at a common image plane over at least both the 3–5 μm and 8–12 μm optical wavebands.

5 Claims, 2 Drawing Sheets

| SURFACE | RADIUS | THICKNESS | APERTURE | MATERIAL |
|---|---|---|---|---|
| OBJECT | ∞ | 65.761 | | AIR |
| STOP | ∞ | 9.000 | 6.000 | AIR |
| A | 36.51 | 5.000 | 7.000 | ZnSe |
| B | -36.51 | 0.965 | 7.000 | AIR |
| C | -26.13 | 4.000 | 7.000 | ZnS |
| D | -167.67 | 31.580 | 7.000 | AIR |
| IMAGE | ∞ | — | — | AIR |

EQUIVALENT FOCAL LENGTH 24.58

CONJUGATE RATIO—∞:1

| SURFACE | RADIUS | THICKNESS | APERTURE | MATERIAL |
|---|---|---|---|---|
| OBJECT | ∞ | ∞ | — | AIR |
| STOP | ∞ | 0.000 | 12.500 | AIR |
| A | 85.115 | 4.000 | 13.000 | Cs Br |
| B | -99.762 | 1.000 | 13.000 | AIR |
| C | -93 | 4.000 | 13.000 | Zn Se |
| D | -164.595 | 120.954 | 13.000 | AIR |
| IMAGE | ∞ | — | — | AIR |

EQUIVALENT FOCAL LENGTH 124.969

LENS SYSTEMS

BACKGROUND OF THE INVENTION

This invention relates to lens systems, and in particular it relates to lens systems for use with infra-red radiation.

As is well known, all optically transmissive materials have a refractive index, $n(\lambda)$ and a corresponding reciprocal dispersive power or V-value, which are associated respectively with the wavelength $\lambda$ and a defined wavelength interval $\Delta\lambda$. The variation of the refractive index with wavelength results in a single lens exhibiting chromatic abberation i.e. the degree of refraction being dependent upon the wavelength of the refracted radiation. In general, if it is required to bring two different wavelengths to a common axial focus, then two optical materials of different V-values are required. Similarly three materials of different V-values are generally required to focus three different wavelengths and so on.

Optical systems for use with the far infra-red band (generally 8 to 12 $\mu$m) usually employ germanium as the sole optical material. Although only one wavelength may be brought to a common focus within a system employing only germanium elements, it is generally recognised that due to the relatively high V-value of germanium, about 1000, chromatic dispersion will be small enough to ignore in most applications. However, several more recent applications and the use of more complex designs require the chromatic dispersion to be corrected so that for example two wavelengths may be brought to a common focus. In these cases another material such as zinc selenide (ZnSe) or zinc sulfide (ZnS) is combined with the germanium. Systems such as this are generally used when two wavelengths within the far infra-red band, such as eight $\mu$m and eleven $\mu$m, are to be brought to a common focus.

Recent advances in electro-optical systems have led to a requirement that the optical system be adapted to bring radiation from both 3-5 $\mu$m and 8-12 [m wavebands to a common focus within the limit prescribed by the "Rayleigh Quarter-Wave Rule". Current methods of achieving this involve the use of at least three different materials in the optical system, generally comprising ZnS, ZnSe and Ge. It has not previously been though possible that a lens system satisfying these requirements can be produced from only two materials.

SUMMARY OF THE INVENTION

According to the present invention there is provided a lens system comprising one or more lens elements composed of Zinc Selenide (ZnSe) and one or more lens elements composed of one of Zinc Sulfide (ZnS) or Cesium Bromide; configured so as to produce images, at a common image plane, at least over both the 3-5 $\mu$m and 8-12 $\mu$m optical wave bands.

In a first preferred embodiment the lens system comprises one element composed of Zinc Selenide and a second element composed of Zinc Sulfide. The system may comprise a first lens composed of Zinc Selenide and having an equi-biconvex structure, separated from a second lens by a relatively narrow air gap, the second lens having a concave meniscus structure and being composed of Zinc Sulfide.

It is found that such an optical system can provide good imagery in at least both the chosen wavebands and would generally also provide imagery at visible wavelengths down to perhaps 0.5 $\mu$m or even less. Since only two different optical materials are used the system is relatively easy to implement.

In a second preferred embodiment of the invention the system comprises one Zinc Selenide element and one Cesium Bromide element.

The system may comprise a biconvex Cesium Bromide front lens of positive optical power separated by a relatively narrow air gap from a second Zinc Selenide lens of negative optical power.

Preferably the second lens is mensicus in section.

This construction can, similarly to the first, provide good imaging over the chosen wavebands.

DESCRIPTION OF THE PREFERRED EMBODIMENTS

Figures 1, 2:
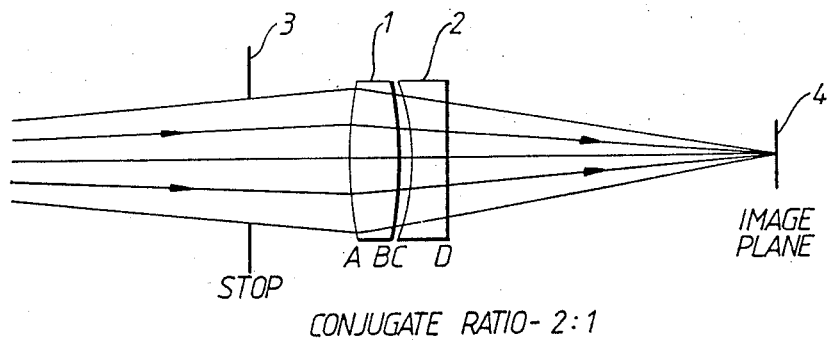
FIG. 1 shows a first lens system according to the invention.
FIG. 2 indicates the dimensions of the structure shown in FIG. 1.

Referring to FIG. 1 a lens system according to the first embodiment of the invention comprises a first lens 1 composed of Zinc Selenide and a second lens 2 composed of Zinc Sulfide. An aperture stop 3 is provided in front of the lenses and transmitted radiation is arranged to come to a focus at an image plane 4.

The first lens 1 is constructed in this particular embodiment to be equi-biconvex with the radius of both faces being 36.51, as is indicated in FIG. 2. In this figure; the 'radius' column relates to the radius of curvature of the particular surface indicated; 'thickness' is the separation between that surface and the following one; 'aperture' relates to the diameter of that surface, such that the diameter is 2 times the aperture, and; the 'material' column shows which optical material is between that surface and the following one. Thus, the system comprises the first lens 1 of equi-bi-convex structure with radii of curvature 36.51, separated by an air gap of 0.965 from the second lens 2 of Zinc Sulfide which has a first negative curvature of 26.13 and a second face of negative curvature 167.67.

The system is arranged in this way to have a conjugate ratio, i.e. the ratio between object and image planes, of 2 to 1. The Zinc Sulfide lens may also be manufactured from any other material with similar chemical composition, such as a product which is a pure form of Zinc Sulfide, known under the Trade Mark Cleatran, which trade mark is the property of CVD Inc, Woburn, MA01801; or Multispectral, which is a product of Schott Glaswerke. The construction shown in FIGS. 1 and 2 will produce a lens system which will provide an image scale of 0.5 times the object scale and provide near diffraction limited imaging performance on axis over both the 3-5 $\mu$m and 8-12 $\mu$m transmission wave bands, measured at a common image plane.

It should however be noted that many other lens systems may be constructed within the scope of the invention to have different guassian properties such as equivalent focal length, which in this case is 24.58, or magnification, but which would still retain the use of only ZnSe and ZnS in the optical elements.

Figures 3, 4:
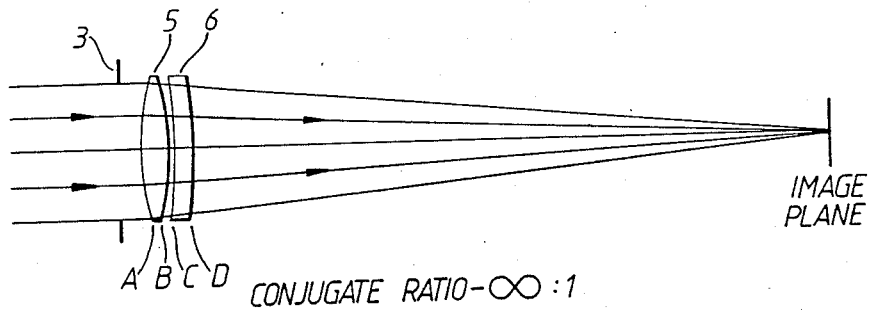
FIG. 3 shows a second lens system according to the invention.
FIG. 4 indicates the dimensions of the system of FIG. 3.

FIGS. 3 and 4 show a second, alternative, embodiment comprising a first and second lens 5 and 6 respectively, of which lens 5 is a biconvex lens of positive optical power manufactured from Cesium Bromide and rear lens 6 is of negative optical power, meniscus in section, and manufactured from Zinc Selenide. The exact dimensions of the system are shown in FIG. 4 in a similar manner to that of FIG. 2.

This second embodiment is adapted to have a conjugate ratio of infinity to one and to have an equivalent focal length of 124.969. As with the first above described embodiment, it should be noted that other configurations may be envisaged within the scope of this second aspect of the invention which may include more lenses or be adapted for use with different wavelength radiation. The embodiments shown in FIG. 3 can again achieve diffraction limited performance over the two wavebands 3–5 μm and 8–12 μm, measured at the same image plane in both cases.

It should be noted that the use of either ZnSe and CsBr, or ZnS and ZnSe alone will significantly reduce the thermal variation of the axial location of an optical image. In this regard, previous systems which included germanium in the optical system did tend to suffer from thermal variation of the optical performance. The systems disclosed herein do not tend to suffer to such a great extent as germanium.

It should also be noted that optical systems in accordance with the invention herein can be constructed to operate over not only the 3–5 μm waveband and 8–12 μm waveband but also may provide good imagery at visible wavelengths down to perhaps 0.5 μm.

A lens system in accordance with either embodiment of the invention may advantageously be used as the refractive element in a Thermal Imager.

I claim:

1. A two-lens system comprising a first lens element composed of Zinc Selenide of equi-biconvex structure, and a second lens element composed of Zinc Sulfide of negative optical power, said first and second lens elements being separated by an air-gap which is relatively narrow compared to the thicknesses of said first and second lens elements and configured so as to produce images, at a common image plane, at least over both the 3–5 μm and 8–12 μm optical wavebands.

2. A two-lens system as claimed in claim 1 wherein said first lens element has a first refractive surface with a radius of 36.51 mm and a second refractive surface spaced from said first refractive surface with a radius of −36.51 mm, the spacing between the first and second refractive surfaces of said first lens element being 5.000 mm and the aperture of each of said first and second refractive surfaces being 7.000 mm; and wherein said second lens element has a third refractive surface with a radius of −26.13 mm and a fourth refractive surface spaced from said third refractive surface with a radius of −167.67 mm, the spacing between the third and fourth refractive surfaces of said second lens element being 4.000 mm and the aperture of each of said third and fourth refractive surfaces being 7.000 mm, the distance between the second refractive surface of said first lens element and the third refractive surface of said second lens element being 0.965 mm.

3. A Thermal Imager, including a lens system as claimed in claim 2.

4. A two-lens system comprising:
   a first lens element composed of Cesium Bromide, said first lens element having a first refractive surface with a radius of 85.115 mm and a second refractive surface spaced from said first refractive surface with a radius of −99.762 mm, the spacing between the first and second refractive surfaces of said first lens element being 4.000 mm and the aperture of each of said first and second refractive surfaces being 13.000 mm; and
   a second lens element composed of Zinc Selenide, said second lens element having a third refractive surface with a radius of −93 mm and a fourth refractive surface spaced from said third refractive surface with a radius of −164.595 mm, the spacing between the third and fourth refractive surfaces of said second lens element being 4.000 mm and the aperture of each of said third and fourth refractive surfaces being 13.000 mm, the distance between the second refractive surface of said first lens element and the third refractive surface of said second lens element being 1.000 mm;
   said first and second lens elements forming one optical path and being configured so as to produce images, at a common image plane, at least over both the 3–5 μm and 8–12 μm optical wavebands.

5. A Thermal Imager, including a lens system as claimed in claim 4.

* * * * *